March 15, 1938.  F. A. FRITZSCH  2,111,096
GUIDEWAYS FOR CARRIAGES
Filed Aug. 16, 1935  2 Sheets-Sheet 2
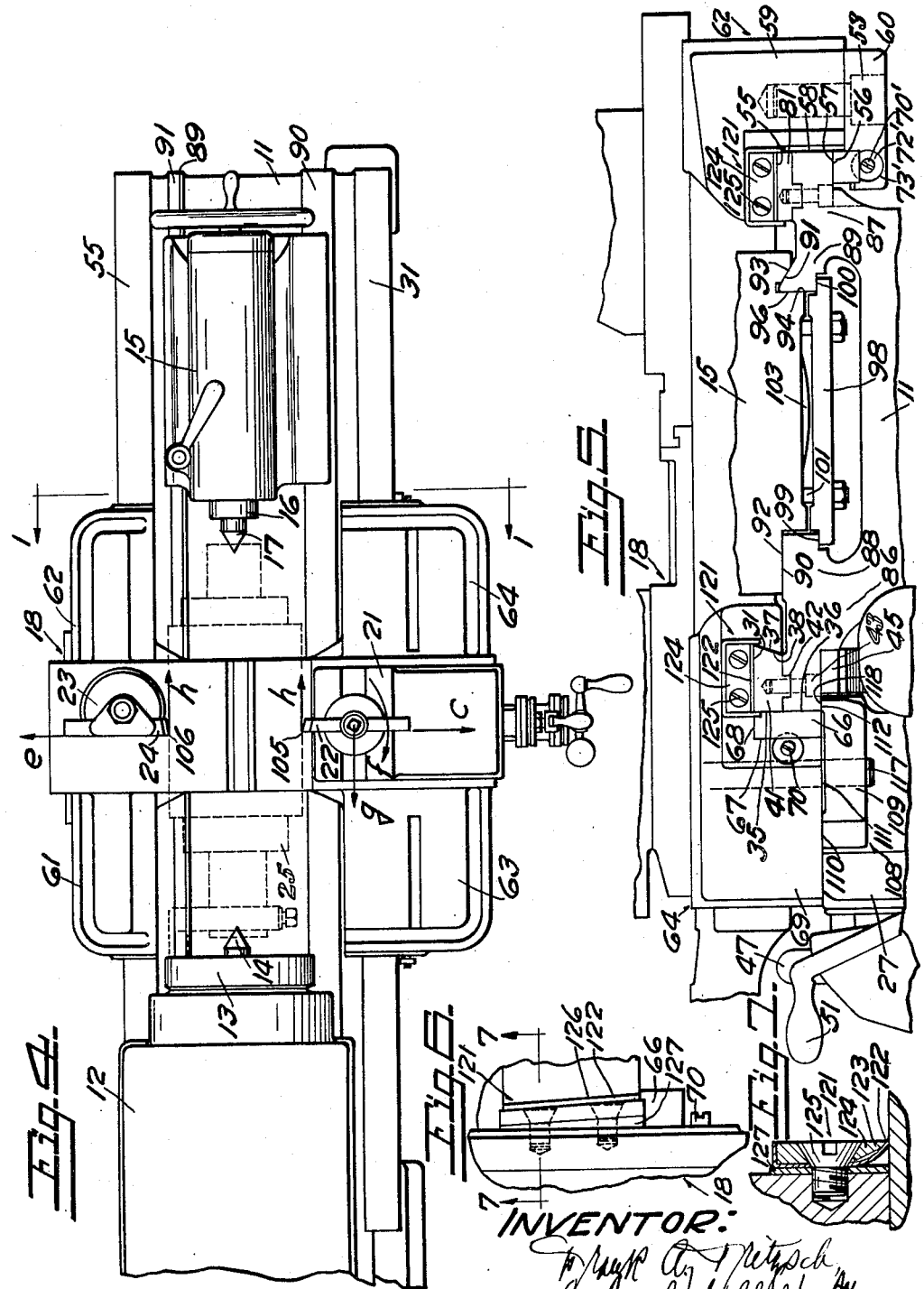
INVENTOR:

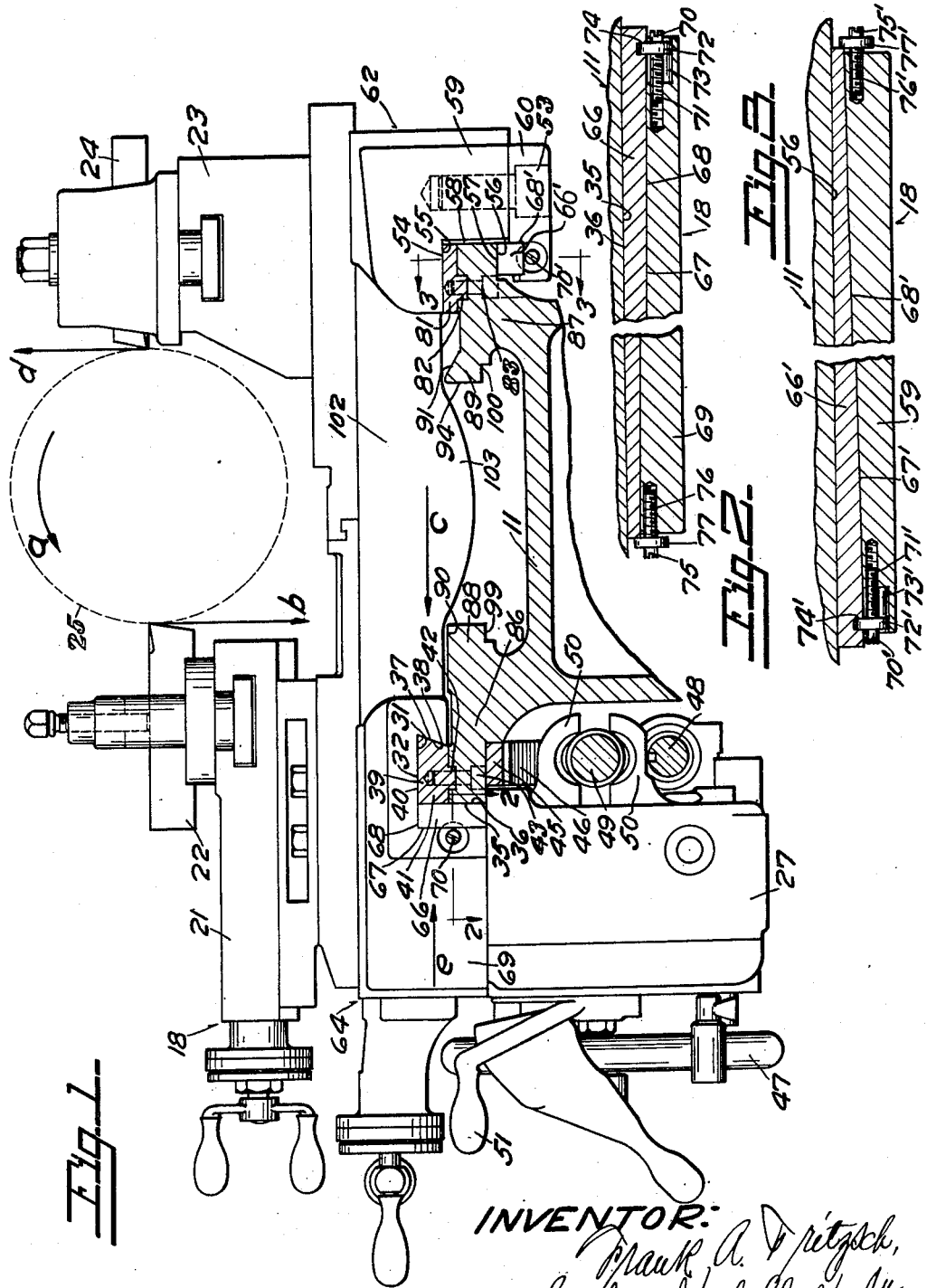

Patented Mar. 15, 1938

2,111,096

UNITED STATES PATENT OFFICE 2,111,096

GUIDEWAY FOR CARRIAGES

Frank A. Fritzsch, Cincinnati, Ohio, assignor to The Lodge & Shipley Machine Tool Company, Cincinnati, Ohio, a corporation of Ohio Application August 16, 1935, Serial No. 36,570

4 Claims. (Cl. 308—3)

My invention relates to guideways for carriages, especially in metal working machinery, and is exemplified in a lathe. My invention relates particularly to means for supporting and guiding carriages on the supports or beds therefor.

Exemplifying lathes, in lathes of usual construction, the supports or beds are to a large extent provided with guides of substantially inverted V-shaped cross-section for supporting and guiding the carriages slidably on the beds, these guides being usually termed V's or vees. When subjected to the stresses set up by the high cutting speeds used and heavy cuts taken in present day practice, such V's have proven inefficient for several reasons.

The feeding force applied to the carriage by the usual feed screw or rack and pinion feed, and the resistance encountered by the tool when moving in feeding direction, form a force couple that tends to twist the carriage or cause torsional movement of the carriage in a horizontal plane. This twisting or torsion action causes the carriage to climb more or less in reverse directions at the respective ends of the carriage on the guideways as usually heretofore constructed, resulting in the lateral wearing of the walls of the V grooves in the carriage and of the V ribs on the bed.

The wear on the walls of the grooves in the carriage is the more apparent, as it is more localized than the wear of the guides on the bed. The wear on the walls of the grooves in the carriage from the respective sides of the tool to the respective ends of the carriage, causes the worn walls to become flaring and the respective ends of the grooves to become bell-mouthed.

When thus worn, minute chips of metal, grit, scale, and particles of dirt readily become lodged between the mating surfaces of the guideways of the support and carriage, and cause scoring and increase in the wearing action between the same.

The carriage must also resist the horizontal force due to the tool engaging the work and tending to move the carriage crosswise of the bed. Since the faces on the V's which must resist this force are presented at a slanting angle to the line of the force, there is a tendency for the faces of the guideways on the carriage to slip in a vertical plane, and to climb upon the guides on the bed, resulting in further unequal wear.

V ways are further ill suited to resist the vertical forces upon the carriage, due to the action of the tool on the work, as they have only slantingly presented faces to resist downward forces, and they are not resistant to forces tending to lift the carriage.

Furthermore, the forces exerted by the carriage on the bed at the front guideway are widely different from those at the rear guideway. Since in the usual construction of lathes both front and rear guideways are of duplicate form, it is obvious that both cannot be best suited to resist the respective forces.

A further disadvantage in such constructions is the difficulty with which alignment is maintained when even a slight amount of wear takes place, since relative alignment should be obtained in both front and rear guideways, and the amount of wear is in practice not equal in both.

It is difficult, further, to make compensation for wear, since it should be made at both front and rear guideways in such a manner as to maintain perfect alignment of both, and it is very easy to nullify the aligning effect of one guideway in adjusting the compensating means for the other guideway.

Having in mind the defects of the art, it is the object of the present invention to provide novel and improved forms of guideways for carriages in which these defects are avoided.

My invention consists in novel means for overcoming the objections to previous constructions noted; further, in novel means for guiding a carriage lengthwise of its support; further, in novel means for resisting the cutting stresses upon the carriage; further, in novel means to transversely localize the lengthwise guiding means; further, in novel means to distribute the resistance to lifting forces due to cutting stresses; further, in novel take-up means for compensating for wear; further, in providing and relating guiding faces in novel manner; and, further, in relating the take-up means for the guiding faces in novel manner.

The invention will be further readily understood from the following description and claims, and from the drawings, in which latter:

Fig. 1 is a cross-sectional view of an exemplifying lathe having my invention applied thereto, taken on the line 1—1 of Fig. 4, partly broken away, with the scrapers and front clamp omitted, and with the work shown in dotted lines.

Fig. 2 is a horizontal sectional detail view of a laterally acting gib adjusting means, taken on the line 2—2 of Fig. 1, and partly broken away.

Fig. 3 is a vertical sectional detail view of a vertically acting gib adjusting means, taken on the line 3—3 of Fig. 1, and partly broken away.

Fig. 4 is a plan view of the exemplifying lathe, having my invention applied thereto, partly broken away, and with the work and its fastening dog shown in dotted lines.

Fig. 5 is an end view of the exemplifying lathe having my invention applied thereto, and partly broken away, and having the scrapers and front clamp applied thereto.

Fig. 6 is a plan view of a detail of the same; and,

Fig. 7 is a longitudinal section of the same, taken on the line 7—7 of Fig. 6.

The lathe exemplified comprises a support or bed 11, a head stock 12 in which a head spindle 13 is journaled and suitably operated and having a head center 14, a tail stock 15 carrying a tail spindle 16 having a tail center 17, and a carriage 18 mounted on the bed and slidable lengthwise thereon.

The carriage is exemplified as having a front tool support 21 having a front tool 22 secured thereto and a rear tool support 23 having a rear tool 24 secured thereto. The tools are arranged to operate on a piece of work 25, exemplified as located by the centers and suitably secured to the head spindle and rotating in the direction of the arrow a, and shown in dotted lines.

The front tool has an upwardly presented cutting edge, and the rear tool has a downwardly presented cutting edge, these cutting edges being located in the horizontal plane in which the axes of the centers are located. Other usual means for supporting and rotating the work may be provided.

Either one or both of the tools may operate on the work, the cutting of the work being usually obtained by the front tool.

The tool supports or slides are supported and individually or combinedly adjustable and feedable on the carriage toward and from the axes of the centers, by any usual or ordinary means, dependent on the character of work being performed, and are held to the carriage by any ordinary or usual means.

A usual apron 27 depends from the front of the carriage and contains the usual control means for the feeding and threading movements of the carriage lengthwise of the bed and of the cross slide or tool supports on the carriage crosswise of the bed either by hand or by power.

The parts thus far described may be of ordinary or usual construction and arrangement, and may include the usual and ordinary adjusting and operating devices customary in machines of this character.

The carriage is supported on and slidable lengthwise of the bed for positioning and feeding the same. The tail stock is slidable lengthwise of the bed and secured thereto in adjusted positions, dependent on the length of work to be accommodated between the centers.

In my improved device I have provided a pair of spaced apart sets of guideways between the carriage and the bed, both of which include supporting faces of substantial width, exemplified as flat horizontally disposed supporting faces for receiving the supporting and depressing operating stresses of the carriage on the bed, and one of which also includes coacting hold-down faces resisting separation between said supporting faces, also exemplified as flat horizontally disposed coacting faces.

The other of said sets of guideways also includes coacting guiding faces resisting lateral displacement crosswise of the bed between the carriage and the bed, and is exemplified as having some of these guiding faces so formed as to resist separating stresses between the carriage and the bed.

The latter set of guideways is exemplified between the front side of the carriage and the front longitudinal portion of the bed, and the other of said sets of guideways is represented between the rear side of the carriage and the rear longitudinal side of the bed.

The front guideways include a supporting face 31 on the bed and a coacting supporting face 32 on the carriage. These are shown as flat, wide horizontal faces.

Front guiding faces 35, 36 respectively on the carriage and on the bed are located at the front edges of the supporting faces 31, 32, and extend downwardly therefrom. These latter guiding faces are preferably flat bearing faces of substantial width, and preferably at right angles to said supporting faces 31, 32, being shown as vertical guiding faces.

Coacting guiding faces 37, 38 are opposed to the guiding faces 35, 36, and act in conjunction therewith and with the supporting faces 31, 32 for guiding the carriage lengthwise of the bed and holding the carriage down to the bed. The guiding faces 37, 38 are preferably flat faces extending downwardly from the rear edges of the supporting faces 31, 32, and slant forwardly at an acute angle thereto for forming a dovetailed rib or tongue 39 and a dovetailed groove 40 between the carriage and the bed tapering toward the base of said tongue. The undercut faces of the tongue and groove are presented toward the vertical plane in which the axis of the rotation of the work is located for resisting lifting action on the carriage as hereinafter explained.

The supporting face 31, a portion of the guiding face 36 and the guiding face 38 may be on a separate bar 41 extending lengthwise of the bed and positioned with relation thereto by tongue and groove connection 42 and fastening screws 43 for clamping said bar to the bed and enabling the supporting and guiding faces of said bar to be hardened and finished in advance of application thereof to the bed.

The bed is provided with a rack 45 extending lengthwise of the bed and located under the front set of guideways just described, a pinion 46 meshing therewith, the pinion being suitably operated manually by a suitable hand wheel 47 or by power by means of a suitable feed shaft 48 extending lengthwise of the bed and suitably operated by power mechanism at the head end of the machine.

The carriage is also feedable lengthwise of the bed by means of a lead screw 49, with which half nuts 50 are arranged to be engaged by a suitable operating arm 51 for screw-feeding the carriage lengthwise of the bed when desired, the lead screw being suitably rotated by operating means located at the head end of the machine. This lead screw is also located under the front set of guideways.

The rack and pinion and the lead screw and nut are preferably located in the same vertical plane in which the front guideways are located and are in close adjacency to said guideways, the rack and pinion by means of which the heaviest cuts are produced between the tool and the work being proximate to and immediately under said front guideways, so as to transmit the feeding forces thereof directly in line with said set of front guideways. In this manner the lines of feeding force are parallel with and closely adjacent to said supporting and guiding faces and underneath said supporting and guiding faces to avoid binding forces upon said supporting and guiding faces which might have a tendency to cause resistance of sliding movement of the carriage.

The set of supporting and guiding faces just described preferably provides the sole lateral guiding means to resist twisting or torsion movements of the carriage, the balance of the carriage being free to assume lateral positions determined by said lateral guiding faces. The lateral guiding faces are closely adjacent to each other for transversely localizing the lateral guiding faces within narrow compass.

The other set of guideways, exemplified as the rear guides, comprises coacting supporting faces 54, 55, respectively on the carriage and the bed, extending lengthwise of the bed and being preferably flat horizontal guiding faces of substantial width. The hold down guiding faces at said rear of the carriage comprise the guiding faces 56, 57 respectively on the carriage and on the bed, and resist separating movement between the last-named supporting faces 54, 55. They hold down the carriage and counteract the lifting stresses upon the carriage due to the cutting forces between the respective tools and the work. There is preferably a clearance space 58 between the rear edge of the bed and the depending portion 59 of the carriage. A block 60 is secured to the lower face of said depending portion. This block supports the guiding face 56. The block is secured to said depending portion by bolts 53.

The supporting faces, and the guiding faces and the hold down faces of the respective sets of guideways preferably extend throughout the full length of the carriage, and throughout the wings 61, 62, 63, 64, at the respective ends thereof, for forming coacting guiding faces between the carriage and the bed, especially at the respective ends of the carriage and throughout the wing portions of the latter.

Adjusting means are provided for adjusting the faces on the carriage and on the bed relatively to each other. These adjusting means preferably comprise a part on which one of the vertical guide faces of the front set of guides is located, and a part on which one of the hold down faces of the rear set of guides is located, these adjustable faces being at right angles to each other and so related that their adjustments do not disturb one another. They are so arranged that the adjustment of the vertical guide face adjusts not only the lateral guide faces of the front guides, but also the contact relation between the supporting faces of said front guides due to the tapering tongue and groove formation of said lateral guiding faces contracting toward the base of the tongue thereof.

Thus the guide face 35 is located on a gib 66, which is shown as a tapered gib seated on a tapered coacting face 67 in a recess 68 extending lengthwise of the front depending portion 69 of the carraige. A screw 70 has threaded connection 71 with one end of the carriage, and is provided with a flange 72 adjustable in axial direction in a recess 73 in the end of the carriage, the flange being received in a slot 74 in one end of the gib, so that adjustment of the screw in its threaded connection will move the flange axially in or out, and consequently the gib lengthwise along its inclined seat for adjusting its guiding face toward and from the coacting guiding face 36 on the bed.

At the opposite end of the carriage there is a screw 75 which has threaded connection 76 with the opposite end of the carriage. This screw has a flange 77 abutting against the end of the wedge gib.

In adjusting the gib, the screw 70 is turned until the guiding face 35 on said gib makes intimate contact with the guiding face 36 on the carriage. The screw is then slightly retracted so as to provide a sliding fit between the gib and the guiding face on the bed, and the screw 75 is then tightened for definitely positioning the gib lengthwise with relation to the carriage.

The hold down face 56 at the rear of the carriage, represented by a horizontal guiding face, is located on a similar gib 66' adjustable in similar manner by similar parts designated by similar reference numerals with the exponent prime.

The rear supporting face 55 may be formed on a bar 81 extending lengthwise of the bed, and may be a hardened supporting face preformed thereon, the bar being positioned on the bed by means of a tongue and groove connection 82 extending lengthwise of the bed and secured thereto by fastening screws 83.

The guiding and supporting faces of the front guideway may be located on a forwardly outwardly extending ledge 86 on the bed, and the rear guides may be located on a rearwardly outwardly extending ledge 87 on the bed.

The bed may be provided with inwardly extending ledges 88, 89 respectively at the front and rear of the bed to form supporting faces 90, 91, coacting with supporting faces 92, 93 on the tail stock and a guiding face 94 on the bed coacting with a guiding face 96 on the tail stock, a clamping bar 98 extending under said ledges 88, 89, the respective forward and rear end thereof being clamped to clamping faces 99, 100 by means of clamping bolts 101 for clamping the tail stock in adjusted position to the bed. Other attachments requiring alignment with the head spindle may be similarly secured to these inner supporting, guiding and clamping faces on the bed.

It will be noted that the supporting and guiding faces for the tail stock are on a level below the level of the supporting faces between the bed and the carriage, enabling the carriage to be made so as to have additional strength by providing space for a depending portion or portions or crossbridge 102 of the carriage between the guideways for the carriage, and an additional depending bulge 103 of the cross-bridge between said inwardly extending ledges.

Referring to Fig. 1, the direction of downward pressure resulting from cutting contact between the front tool and the work is represented by the arrow b, and is resisted by the wide flat horizontal supporting faces 31, 32 at the front side of the carriage, and also reacts upon the wide flat horizontal supporting faces 54, 55 at the rear side of the carriage, these supporting faces distributing the reacting force of the cutting over a wide area and distributing the wear incident thereto for long life of the supporting faces.

The incidence of the line of force directed upon the carriage caused by the coaction between the front cutting tool and the work is principally at right angles to the flat horizontal supporting faces, producing greatest resistance and least wear.

The back pressure on the front tool due to the cutting action between said tool and the work tends to move the carriage transversely of the bed away from the work, indicated by the direction arrow c, and all movement of the carriage in similar direction is resisted by the inclined guide faces 37, 38, these inclined guide faces also resisting tendency of upward movement of the carriage and insuring intimate supporting contact between the supporting faces between the carriage and the bed, especially at the front of the carriage. All tendency to raise the rear of the carriage by such pressure is counteracted by the rear hold down faces 56, 57.

When employing a rear cutting tool, a lifting line of force, represented by the arrow *d*, acts upon the carriage, which tends to lift the carriage, and is resisted at the rear side of the carriage by the coacting hold down guiding faces 56, 57. Such lifting tendency of the carriage is also resisted at the front side of the carriage by the undercut dovetailed connection of the front guideways, represented by the slanting guiding faces 37, 38, presented toward the tool, for holding the carriage downwardly and resisting upward movement of the carriage by the upwardly increasing cross-section between the undercut tongue and groove of the front guiding connection between the carriage and the bed.

The cutting action between the rear tool and the work also induces a rearward pressure line of force, exemplified in horizontal plane by the arrow *e*, which is resisted by the coacting guiding faces 35, 36 at the front of the carriage.

The mesne lines of forces or direction of stress between the cutting edges of the tools and the respective guiding and supporting faces are at different angles, determined by the distances of contact between the tool or tools and the work, from the axis of rotation of the work, the reactions upon the supporting surfaces and guiding surfaces remaining, however, as described, but changing merely their angles of presentation.

Referring now to the twisting or torsional forces upon the carriage, and referring to Fig. 4, the contact points 105, 106 between the cutting edges of the tools and the work may be represented as the fulcrums of a lever, whose function is assumed by the carriage, and the point of application of feed to the carriage by the rack and pinion or the lead screw and its nut, may be represented as the force applied to the lever, for causing a twisting or torque movement of the carriage along the arcs, one of which is represented by the arrow *f*, assuming that the front tool only is employed in the present exemplification.

If the rear tool is employed, the fulcrum will be represented by the contact point between the rear tool and the work. If both tools are employed, the fulcrums will have a similar effect upon the carriage.

The forces crosswise of the bed, due to the cutting actions between the front and rear tools and the work, are in lines respectively represented by the arrows *c* and *e*. The line of force of the feeding is in the direction of the arrow *g*, and the line of resistance between the tool and the work lengthwise of the carriage is in the direction of the arrows *h*. These lines of forces result in the twisting or torque tendency of the carriage represented by the arrow *f*.

The resistances to all of these lines of force are relegated to the closely associated lateral guiding faces at the front side of the carriage located within a small compass laterally of the carriage and extending preferably throughout the entire length of the carriage, including the wings at the ends thereof, for impounding all resistances to said stresses within a comparatively narrow margin extending lengthwise of the carriage, and confining the adjustments of said faces within narrow limits closely associated to said faces, leaving the balance of the carriage free to be guided solely by said faces within such narrow compass.

The adjustment of the front gib adjusts collectively the lateral positioning of the entire carriage with relation to the bed and the resistance to separation between the coacting supporting surfaces, due to the presence of the undercut dovetail tongue and groove. The flat horizontal supporting faces and hold down faces between the rear side of the carriage and the bed permit such adjustments at the front side of the carriage without disturbance of adjustment between said faces at the rear side of the carriage.

The adjustment of the rear gib adjusts the capacity for separation between the supporting faces between the carriage and bed at the rear side of the bed, the forms of the front supporting and guiding faces permitting such adjustments without disturbance thereof.

The adjustment of the front guide adjusts the same in a horizontal plane, and the adjustment of the rear guide adjusts the same in a vertical plane.

A clamp 108 may be provided for clamping the carriage to the bed during operations requiring cross feeding only of the tool, as in facing operations. This clamp may comprise a short block 109 (Fig. 5), provided with a heel 110 which forms a fulcrum upon the lower face of the depending front portion 69 of the carriage. It further has a recess 111 between said heel and the clamping face 112.

A screw 117 clamps said block toward the carriage and adjusts the clamping face on said block upon the coacting face 118 on the bed.

In my improved device the forms and relations of the guideways are such that those resisting lateral displacements are cross-sectionally located at opposing coacting guiding faces, which are closely adjacent to each other at the respective sides of a comparatively narrow flange or rib; that said guiding faces include an undercut dovetail connection resisting upward lift of the carriage; that adjustments of said guiding faces may be made without disturbance of adjustment of the coacting faces between the other side of the carriage and bed; that adjustments of said faces may be made in a horizontal plane; and that adjustments at the other side of the carriage may be made in a vertical plane for adjusting the separating capacity between the supporting faces between said other side of the carriage and bed, without disturbance of the adjustments of said first-named coacting guiding faces.

If desired, the respective ends of the supporting faces on the carriage may be provided with wipers, as exemplified, for instance, in Figs. 5, 6, and 7, in which 121 represents a wiper composed preferably of a strip of resilient metal, such as bronze, and having a beveled wiping edge 122, preferably forming a knife edge, urged toward the face which it is wiping, by the toe 123 of a securing plate 124, between which and the end of the carriage the wiping plate is secured by means of screws 125 for forming a tapering scraping edge. If it is desired to arrange said scraping edge on a slant, as shown at 126, a correspondingly tapered shim 127 may be inserted between the body of the scraper and the end of the carriage. The scraping face extends across the face with which it coacts for shearing foreign or undesirable matter from said face to prevent the same from lodging between the coacting supporting or guiding faces.

The location of the rack and pinion and the feed screw and nut with relation to the exemplified supporting and guiding faces between the front of the carriage and front of the bed, insures a direct linear feeding force upon the carriage in close relation to said guides to avoid drag and resistance between said supporting and guiding faces.

In cases in which there is no feeding action lengthwise of the bed, the forces represented by the arrows *h* and *g* are not present, but merely a feeding action crosswise of the bed, as when cutting with a forming tool in which there are equal resistances lengthwise of the bed at the respective sides of the tool.

Having thus fully described my invention, what I claim as new and desire to secure by Letters Patent, is:

1. The combination with a tool carriage, and a support therefor, with the tool of said carriage coacting with rotating work above said carriage to turn said work, of a guide between said carriage and said support comprising coacting flat substantially horizontal contacting supporting faces and coacting lateral closely adjacent guiding faces at the respective edges of said supporting faces including coacting guiding faces slanting into vertical planes in which said horizontal supporting faces are located and at an acute angle to said supporting faces to form an acute guiding angle projected toward said rotating work to resist the cutting thrusts therefrom, and adjusting means adjusting the distance between said coacting lateral guiding faces and by reason of said acute angular arrangement of said coacting guiding faces also adjusting the coaction between said supporting faces.

2. The combination with rotating and centering means for the work, a bed thereunder, a tool carriage slidable lengthwise on said bed, and means for supporting cutting tools on said carriage at the respective sides of the vertical plane in which the axes of said rotating and centering means are located, of guides between said bed and said carriage extending lengthwise of said axes and located at the respective sides of said vertical plane, said guide at one side of said vertical plane comprising a pair of cooperative substantially horizontal flat supporting faces, a pair of cooperative substantially vertical flat resistant faces extending downwardly at the outer margins of said substantially horizontal supporting faces and a pair of cooperative angular flat resistant faces extending downwardly at the inner margins of said substantially horizontal supporting faces at an acute angle to and under said substantially horizontal supporting faces, and adjusting means for adjusting the approach between the resistant faces of one of said pairs of resistant faces whereby to adjust the approach between all of said pairs of faces, and said guide at the other side of said vertical plane comprising a pair of coactive substantially horizontal flat supporting faces and a pair of coactive substantially horizontal flat hold-down faces respectively counteracting downward and upward thrusts between said tools and the rotating work, said guide at said one side of said vertical plane counteracting cutting thrusts between said cutting tools and the rotating work in all transverse directions and said guide at said other side of said vertical plane counteracting thrusts in vertical directions between said tools and said rotating work and yielding in horizontal directions to adjustments in said first-named guide by said adjusting means.

3. In a lathe, the combination with rotating and centering means for the work, a bed thereunder extending lengthwise of the axes thereof, a tool carriage slidable lengthwise on said bed, and means for supporting tools on said carriage at the respective sides of the vertical plane in which said axes are located, of guides between said carriage and said bed extending lengthwise of said axes and located at the respective sides of said vertical plane, said guides at one of said sides comprising cooperative substantially horizontal flat supporting faces, a pair of cooperative substantially vertical resistant faces extending downwardly at the outer margin to said substantially horizontal faces and a pair of cooperative angular flat resistant faces extending downwardly at the inner margins of said substantially horizontal faces at an acute angle to and under said substantially horizontal faces so as to direct the acute angle between said substantially horizontal faces and said angular resistant faces in a couple toward said axes and constructed to direct thrusts between the tool and the work at the said one of said sides of said vertical plane toward the corner of said angle whereby said thrusts are directed against both said substantially horizontal supporting faces and said angular resistant faces, and adjusting means to adjust said faces toward and from said vertical plane, said guides at the other of said sides of said vertical plane comprising pairs of coactive substantially horizontal faces counteracting both upward and downward thrusts between the tools and the work and yielding in substantially horizontal lines to adjustments in said first-named guide, and adjusting means for adjusting the coaction between said last-named pairs of coactive faces.

4. In a lathe, the combination with the bed, the tool carriage and the work supporting and rotating means to rotate the work above the carriage for coaction between the cutting means on the tool carriage and the work for cutting the work, of a pair of guides respectively at the front of the carriage and at the rear of the carriage between the bed and the carriage and extending lengthwise of the bed, said guide at the front of the carriage formed by providing said bed and said carriage with coacting flat substantially horizontal contacting supporting faces, coacting flat substantially vertical contacting guiding faces at the front edge of said supporting faces and coacting flat contacting guiding faces at the rear edge of said supporting faces extending slantingly forward under said supporting faces to form an acute angular guiding structure presented toward the field of cutting action between the cutting means and the work to resist the cutting stresses therefrom, and said guide at the rear of said carriage formed by providing said bed and said carriage with coacting flat substantially horizontal contacting supporting faces and coacting flat substantially horizontal contacting guiding faces with said carriage shiftable substantially horizontally between said last-named supporting faces and said last-named guiding faces, and said last-named supporting faces and said last-named guiding faces and said acute angular guiding structure resisting upward and downward cutting stresses due to cutting action between the cutting means and the work, and adjusting means for adjusting the pressure between said flat substantially vertical contacting guiding faces whereby the contact relations between all said faces are adjusted.

FRANK A. FRITZSCH.